Patented Nov. 12, 1929

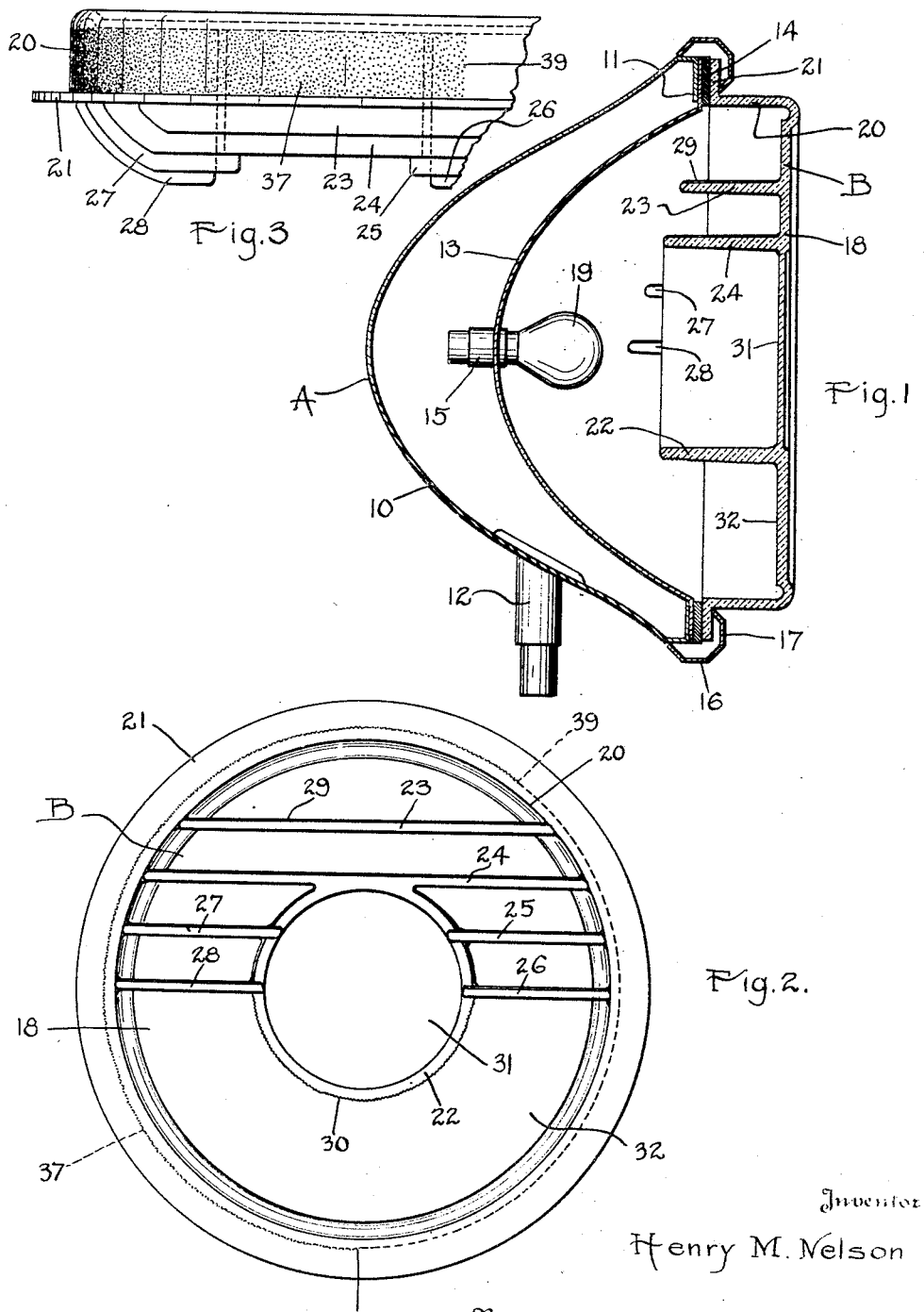

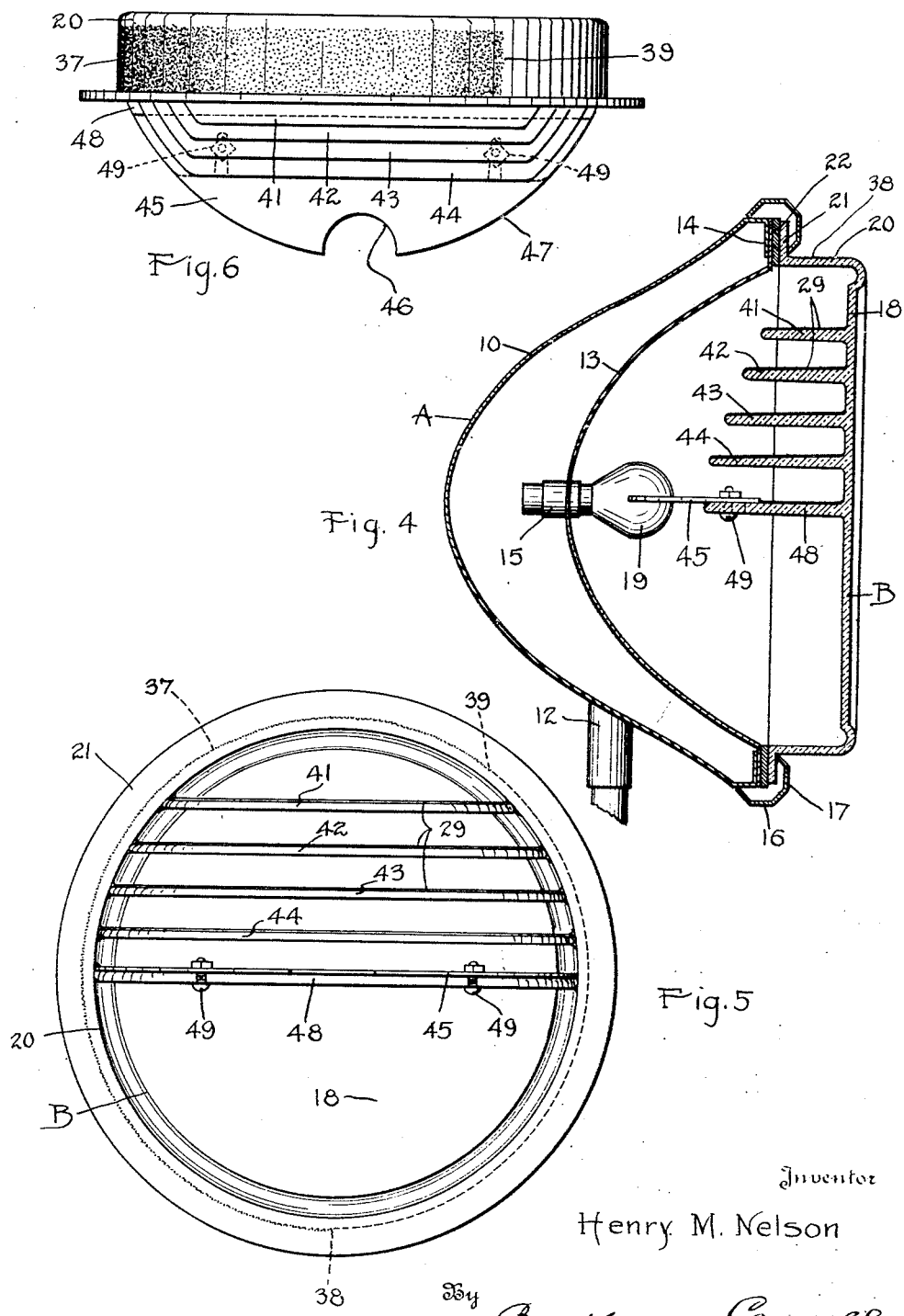

1,735,208

UNITED STATES PATENT OFFICE

HENRY M. NELSON, OF MINNEAPOLIS, MINNESOTA, ASSIGNOR TO GEORGE B. SHAW, OF EAU CLAIRE, WISCONSIN

LENS

Application filed October 7, 1926. Serial No. 140,069.

My invention relates to lenses and particularly to lenses for use in conjunction with headlights of motor vehicles, and has for its object to provide a lens whereby the glare usually occurring is appreciably diminished and whereby a maximum amount of light is transmitted through the lens.

Another object of the invention resides in constructing the lens with a flange adapted to be mounted in the lens holder, which flange has issuing outwardly from it a ring like portion terminating in a circular face, said face having integrally connected to it a tubular deflector member between which and said ring like portion are situated a plurality of horizontal deflector plates all integrally connected to said ring like portion and tubular deflector.

Another object of the invention resides in providing mirrors upon the upper surfaces of said horizontal deflector and said tubular deflector so as to cause the light approaching said deflectors in an upward direction to be deflected downwardly.

With the foregoing and other objects in view, which will appear in the following description, the invention resides in the novel combination and arrangement of parts and in the details of construction hereinafter described and claimed.

In the drawings:

Fig. 1 is a longitudinal sectional view of an automobile headlight illustrating the application of my improved lens thereto.

Fig. 2 is a rear elevational view of the lens removed from the headlight.

Fig. 3 is a plan view of a portion of the structure shown in Fig. 2.

Figs. 4, 5 and 6 are views similar to Figs. 1, 2 and 3, showing a modification of the invention.

For the purpose of illustrating the application of the invention I have shown an ordinary headlight A constructed with a shell like case 10 open at the forward end and provided with an internally extending flange 11. The case 10 is mounted upon any suitable support 12 by means of which the head light may be supported on the chassis of the motor vehicle. Within the case 10 is positioned a parabolic reflector 13 formed with a flange 14 adapted to overlie the flange 11 of said case. This parabolic reflector has attached to it along the axis thereof a light socket 15 adapted to receive an electric light bulb 19 in such a manner as to prevent the filament thereof at the focus of said reflector. In conjunction with the flange 11 of said case 10 is provided a lens holder 16 having a rim 17, which lens holder is arranged to be attached to the case proper by any suitable means, which being well known in the art have not been shown in the drawings. This lens holder operates in the usual manner to cause the rim 17 thereof to engage the flange of the lens and hold the same in position in the front of the head light.

The lens proper indicated in its entirety at B is preferably constructed of glass or some other suitable transparent material and comprises primarily a body portion formed with a circular plate 18. Along the margin of this plate is constructed an inwardly extending sleeve 20 which terminates in an outwardly extending flange 21. The sleeve 20 is of such a size as to snugly pass through the opening through the rim 17 of the lens holder 16, while the flange 21 is so proportioned as to overlie the flange 14 of the reflector 13. In mounting the lens a cushioning gasket 22 is employed which is positioned between flange 14 of the reflector 13 and the flange 21 of the lens proper.

In the form of my invention shown in Figs. 1, 2 and 3, a single tubular deflector 22 is employed which is integrally connected to the plate 18 of the lens in concentric relation thereto, and to the sleeve 20. This tubular deflector extends inwardly beyond the flange 21 toward the light bulb 17. In conjunction with this deflector I employ a plurality of deflector plates 23, 24, 25, 26, 27 and 28, horizontally positoned, which are situated between the tubular deflector 22 and the sleeve 20. These deflectors are spaced from one another and substantially occupy the entire upper half of the space between the tubular deflector 22 and sleeve 20. It will be noted that the deflectors 25 and 27 are in alignment and also the deflectors 26 and 28. It will be further noted that all these deflectors project outwardly beyond the flange 21 in the direction of the light bulb 17 and that the length of the said deflectors progressively increase, the deflectors 28 and 26 being the longest.

Along the upper surface of all of these deflectors, as well as the upper half of the outer surface of the deflector 22 as indicated at 29, the said deflectors are provided with a coating of a suitable silver preparation to form mirrors in conjunction therewith, adapted to reflect upwardly extending rays in a downward direction. The remainder of the outer surface of the tubular deflector 22 is preferably frosted as indicated at 30 so as to cause the light rays which approach the same in a downward direction to be diffused and to light the ground ahead of the vehicle, if desired. This portion of the tubular deflector 22 may be constructed of clear glass or the same may be entirely omitted, if desired, without departing from the invention.

In addition to the frosting of the said deflectors the sleeve 20 is preferably frosted as indicated at 37 from a point 38 at the lowermost portion of the same and around the left hand side of the lens and above the upper portion thereof to a point 39 to the right of the said upper portion, leaving the balance of the said sleeve of clear glass.

The operation of my improved lens is as follows: When the lens is mounted in a suitable headlight, as indicated in Fig. 1, the rays of light from the bulb 19 which extend outwardly and rearwardly from the same are reflected by means of the reflector 13 to project from said reflector in parallel relation to the axis thereof passing freely through the portions of the plate 18 between the various deflectors 23, 24, 25, 26, 27 and 28 and the annular deflector 22 as well as the space within the same and below it. In addition a portion of the forwardly projecting rays from the light source near the center of the lens are directly projected through the portion 31 of plate 18 where the same are directly cast upon the road. Although a number of such rays will be directed upwardly, yet the same will not cause an appreciable glare due to the fact that their number is small and further to the fact that the angularity of such upwardly turned rays is so slight as not to bring the same within the vision of the pedestrian or approaching driver. The downwardly directed rays directly emanating from the light bulb 19 are projected through the annular space 32 positioned between the tubular reflector 22 and the sleeve 20 below the deflectors 26 and 28. These rays also are directly cast upon the road. All of the upwardly extending rays above the horizontal diameter of the lens 18, which do not pass through the portion 31 thereof strike one or the other of the various deflectors 23, 24, 25, 26, 27, and 28, or the tubular deflector 22 and are caused to be directed in a downward direction, thereby preventing the same from being thrown into the vision of the pedestrian or approaching vehicle. In this manner but a small percentage of the rays from the head light are cast upwardly so the head light may be viewed without the usual glare customary with the unshielded head light. In addition a part of the rays passing through the sleeve 20 through the clear space afforded therein are cast upon the side of the road illuminating the gutter and curb so that the driver at all times has a clear vision of the side of the road as well as the road ahead.

In Figs. 4, 5 and 6 I have shown a modified form of the invention. This device is similar to that shown in Figs. 1, 2 and 3, except that the tubular deflector 22 has been omitted and the horizontal deflectors which are indicated at 41, 42, 43, and 44 and 48 are run completely across the lens in horizontal spaced relation from one side of the sleeve 20 to the other, all of said deflectors being positioned at or above the horizontal diameter of the lens. In addition thereto I employ a partition 45 which is situated in horizontal position along the axis of the light bulb 19 and reflector 13. This partition is provided with a curved notch 46 adapted to fit around the light bulb and is further curved along its edges 47 to cause the same to conform to the configuration of the reflector 13. This partition may be constructed of metal and is mounted in the lens B by bolting the same to the deflector 48 by means of a bolt 49. This partition aids in separating the upwardly directed rays of light from the downwardly directed rays of light, causing the head light to operate with a minimum amount of glare.

The invention provides a simple and effective device for minimizing the amount of glare existing with the usual type of motor vehicle head light, and at the same time provides a device which is efficient in transmitting and directing upon the road a maximum amount of light emanating from the light source. My improved lens not only furnishes light in the front of the driver, but also illuminates the road along the curb and gutter so that the driver is at all times informed of the condition of the roads both to the front and sides of him.

Changes in the specific forms of my invention, as herein disclosed, may be made within the scope of what is claimed without departing from the spirit of my invention.

Having described my invention, what I claim as new and desire to protect by Letters Patent is:

1. A lens comprising a body portion providing a circular plate, a tubular deflector connected to said plate and extending toward the source of light, said tubular deflector being concentrically arranged relative to said plate, and a plurality of horizontal deflector plates connected to said plate and extending up to said tubular deflector, said deflector plates being situated across the upper half of said face.

2. A head light lens comprising a body portion including a flange adapted to be positioned within the lens holder of a head light, a sleeve connected with said flange and issuing outwardly therefrom, a plate connected with said sleeve, a tubular deflector concentrically arranged relative to said sleeve in the plate of said lens, and extending toward the source of light, and a plurality of horizontal deflector plates positioned between said sleeve and tubular deflector and being confined to the upper half of the lens.

3. A head light lens comprising a body portion providing a circular plate, a tubular deflector connected to said plate and extending toward the source of light, said tubular deflector being concentrically arranged relative to said plate, and deflector plates connected to said plate and to said tubular deflector.

In testimony whereof, I have signed my name to this specification.

HENRY M. NELSON.